(12) United States Patent
Schulman et al.

(10) Patent No.: US 11,212,313 B2
(45) Date of Patent: Dec. 28, 2021

(54) DETECTION OF DOMAIN NAME IMPERSONATION

(71) Applicant: Segasec Labs Ltd., Tel Aviv (IL)

(72) Inventors: Elad Schulman, Petach Tiqva (IL); Gad Akuka, Ramat Gan (IL)

(73) Assignee: SEGASEC LABS LTD., Tel Aviv (IL)

( * ) Notice: Subject to any disclaimer, the term of this patent is extended or adjusted under 35 U.S.C. 154(b) by 313 days.

(21) Appl. No.: 16/558,109

(22) Filed: Sep. 1, 2019

(65) Prior Publication Data

US 2019/0387024 A1    Dec. 19, 2019

Related U.S. Application Data

(63) Continuation-in-part of application No. PCT/IL2018/050913, filed on Aug. 19, 2018.

(60) Provisional application No. 62/549,440, filed on Aug. 24, 2017.

(51) Int. Cl.
*H04L 29/06* (2006.01)
*H04L 29/12* (2006.01)

(52) U.S. Cl.
CPC ...... *H04L 63/1483* (2013.01); *H04L 61/1511* (2013.01); *H04L 63/0236* (2013.01); *H04L 63/0823* (2013.01); *H04L 63/1416* (2013.01); *H04L 63/1433* (2013.01)

(58) Field of Classification Search
CPC ............. H04L 63/1483; H04L 61/1511; H04L 63/0236; H04L 63/0823; H04L 63/1416; H04L 63/1433; G06F 21/56; G06F 21/554
See application file for complete search history.

(56) References Cited

U.S. PATENT DOCUMENTS

| | | | |
|---|---|---|---|
| 8,869,269 B1 | 10/2014 | Ramzan et al. | |
| 9,118,704 B2 | 8/2015 | Miller | |
| 9,465,789 B1 | 10/2016 | Chen et al. | |
| 9,674,213 B2 | 6/2017 | Oberheide | |
| 9,762,612 B1* | 9/2017 | Schiffman | H04L 61/1511 |
| 10,679,088 B1* | 6/2020 | Dalal | H04L 61/305 |

(Continued)

FOREIGN PATENT DOCUMENTS

WO    2015149552 A1    10/2015

OTHER PUBLICATIONS

International Application # PCT/IL2018/050913 search report dated Dec. 20, 2018.

*Primary Examiner* — Huan V Doan
(74) *Attorney, Agent, or Firm* — Kligler & Associates Patent Attorneys Ltd

(57) ABSTRACT

A method for evaluating domain names includes storing a listing, for a plurality of non-ASCII Unicode characters, of corresponding ASCII characters that are visually similar to the non-ASCII Unicode characters. A record is received of one or more Internationalized Domain Names (IDNs), each IDN containing at least one of the non-ASCII Unicode characters. The corresponding ASCII characters are substituted for the non-ASCII Unicode characters in the record in order to generate candidate ASCII domain names corresponding to the one or more IDNs. The candidate ASCII domain names are compared to one or more protected ASCII domain names. When a candidate ASCII domain name matches one of the protected ASCII domain names, a protective action is initiated with regard to the IDN corresponding to the candidate ASCII domain name.

21 Claims, 2 Drawing Sheets

(56) References Cited

U.S. PATENT DOCUMENTS

| | | |
|---|---|---|
| 2010/0313266 A1 | 12/2010 | Feng et al. |
| 2015/0156210 A1 | 6/2015 | Hunt et al. |
| 2016/0343838 A1 | 11/2016 | Hashimoto |
| 2016/0352772 A1 | 12/2016 | O'Connor |
| 2017/0237765 A1 | 8/2017 | Oberheide |

* cited by examiner

DETECTION OF DOMAIN NAME IMPERSONATION

CROSS-REFERENCE TO RELATED APPLICATION

This application is a continuation in part of PCT Patent Application PCT/IL2018/050913, filed Aug. 19, 2018, which claims the benefit of U.S. Provisional Patent Application 62/549,440, filed Aug. 24, 2017. Both of these related applications are incorporated herein by reference.

FIELD OF THE INVENTION

The present invention relates generally to methods, systems and software for computer network security, and particularly to detection and mitigation of Internet fraud.

BACKGROUND

The Domain Name System (DNS) is one of the key building blocks of the Internet. DNS servers associate each Internet domain name with an Internet Protocol (IP) address of the computer hosting the domain in question. The DNS server receives domain name queries from client computers and sends responses that direct the client computer to the IP address associated with the domain name.

In the past, the DNS recognized only domain names made up of traditional American Standard Code for Information Interchange (ASCII) characters (a-z, A-Z, 0-9, and punctuation symbols). During the past decade, however, the DNS has been expanded to accept Internationalized Domain Names (IDNs), which may include "non-traditional characters" other than the traditional ASCII set, for example, characters in Arabic, Chinese, Cyrillic, Tamil and Hebrew, as well as Latin alphabet-based characters with diacritics or ligatures such as accented characters in French. These non-traditional characters are encoded by computers in multi-byte Unicode (and they are therefore referred to herein as "non-ASCII Unicode characters). They are typically stored in the DNS as ASCII strings using Punycode transcription, which is a way of representing Unicode using the traditional ASCII characters. Using Punycode, domain names containing non-traditional characters are transcoded to a subset of ASCII characters consisting of letters, digits, and hyphen. (A tool for conversion of Punycode to IDN and vice versa is available at punycoder.com.)

Some non-traditional IDN characters are very similar or even identical in appearance to some of the traditional ASCII characters, although they are logically represented differently in Unicode. For example, the Unicode character U+0430, corresponding to the Cyrillic small letter "a", may appear identical to the English lowercase "a", which is Unicode character U+0061, although the computer treats them differently. Different characters that are visually similar are referred to as "homoglyphs."

This visual similarity can easily lead to user confusion, which may be exploited for purposes of Internet security fraud, such as in phishing, pharming, and other types of homoglyph and homograph attacks. For example, an attacker may register an IDN that looks visually like that of a legitimate website, but with one or more of the letters replaced by homoglyphs in another alphabet. The attacker may thus trick an Internet user into thinking that he or she has connected to the original site while directing the user to a spoofed site. The attacker may use the spoofed site to obtain information such as users' passwords and account details.

Methods for detecting potential attacks of this sort are known in the art. For example, U.S. Pat. No. 9,118,704 describes a homoglyph monitoring system, which includes an attack vector string matching module to determine potential attack vector strings for a target domain name. Each potential attack vector string includes a different homoglyph of a character in the target domain name. The system includes a domain name system (DNS) analyzer module to facilitate lookups on DNS servers based on the potential attack vector strings and to identify a DNS record including a potential attack vector string.

SUMMARY

Embodiments of the present invention that are described hereinbelow provide methods, systems and software for detecting and mitigating impersonation of domain names.

There is therefore provided, in accordance with an embodiment of the invention, a method for evaluating domain names. The method includes storing a listing, for a plurality of non-ASCII Unicode characters, of corresponding ASCII characters that are visually similar to the non-ASCII Unicode characters. A record is received of one or more Internationalized Domain Names (IDNs), each IDN containing at least one of the non-ASCII Unicode characters. The corresponding ASCII characters are substituted for the non-ASCII Unicode characters in the record in order to generate candidate ASCII domain names corresponding to the one or more IDNs. The candidate ASCII domain names are compared to one or more protected ASCII domain names. When a candidate ASCII domain name matches one of the protected ASCII domain names, a protective action is initiated with regard to the IDN corresponding to the candidate ASCII domain name.

In a disclosed embodiment, storing the listing includes storing respective similarity scores indicating a degree of similarity between the non-ASCII Unicode characters and the corresponding ASCII characters, and comparing the candidate ASCII domain names includes applying the similarity scores in deciding whether the candidate ASCII domain names match the protected ASCII domain names.

In one embodiment, receiving the record includes obtaining a Domain Name System (DNS) zone file, for example from a registrar of domain names, containing resource records, and processing the resource records in order to identify the one or more IDNs. Additionally or alternatively, receiving the record includes obtaining a Certificate Transparency (CT) log containing records of digital certificates, and processing the log in order to identify the one or more IDNs.

In some embodiments, initiating the protective action includes accessing, via a network, a resource identified by the IDN corresponding to the candidate ASCII domain name, and analyzing the resource in order to detect malicious content. In one embodiment, accessing the resource includes reading a Web page having a uniform resource locator (URL) containing the IDN, and detecting a phishing attack associated with the Web page.

There is also provided, in accordance with an embodiment of the invention, apparatus for evaluating domain names, including a memory configured to store a listing, for a plurality of non-ASCII Unicode characters, of corresponding ASCII characters that are visually similar to the non-ASCII Unicode characters. A processor is configured to receive a record of one or more Internationalized Domain Names (IDNs), each IDN containing at least one of the non-ASCII Unicode characters, to substitute the corresponding ASCII characters for the non-ASCII Unicode characters in the record in order to generate candidate ASCII domain names corresponding to the one or more IDNs, to compare the candidate ASCII domain names to one or more protected ASCII domain names, and when a candidate ASCII domain name matches one of the protected ASCII domain names, to initiate a protective action with regard to the IDN corresponding to the candidate ASCII domain name.

There is additionally provided, in accordance with an embodiment of the invention, a computer software product, including a non-transitory computer-readable medium in which program instructions are stored, which instructions, when read by a computer, cause the computer to store a listing, for a plurality of non-ASCII Unicode characters, of corresponding ASCII characters that are visually similar to the non-ASCII Unicode characters, to receive a record of one or more Internationalized Domain Names (IDNs), each IDN containing at least one of the non-ASCII Unicode characters, to substitute the corresponding ASCII characters for the non-ASCII Unicode characters in the record in order to generate candidate ASCII domain names corresponding to the one or more IDNs, to compare the candidate ASCII domain names to one or more protected ASCII domain names, and when a candidate ASCII domain name matches one of the protected ASCII domain names, to initiate a protective action with regard to the IDN corresponding to the candidate ASCII domain name.

The present invention will be more fully understood from the following detailed description of the embodiments thereof, taken together with the drawings in which:

DETAILED DESCRIPTION OF EMBODIMENTS

The international DNS currently lists hundreds of millions of domain names, and the total number of domain names grows by millions more every year. Furthermore, as explained in the above-mentioned PCT/IL2018/050913, when all possible substitutions of homoglyphic non-traditional characters for ASCII characters are taken into account, there may be millions or even many billions of possible IDNs that are visually similar to a given ASCII domain name. Therefore, despite the widespread threats associated with the malicious use of IDNs as substitutes for legitimate domain names, searching the Internet for all of the IDNs that could be used as substitutes for an ASCII domain name is highly resource-intensive and in many cases impractical.

Embodiments of the present invention that are described herein take the opposite approach to this problem, by evaluating IDNs as they are registered in order to assess whether they have the potential of being used maliciously by virtue of their similarity to a set of protected ASCII domain names. This approach is more practical and economical than the sorts of exhaustive search strategies that are mentioned above, because typically, each IDN will be visually similar to no more than one or two ASCII domain names. (Most IDNs will not resemble any existing ASCII domain names at all.) Furthermore, lists of newly-registered IDNs are available from various sources, such as DNS zone files issued by domain name registrars and Certificate Transparency (CT) logs containing records of digital certificates. These lists can be accessed and evaluated regularly in order to promptly identify and mitigate potential threats.

Thus, in the disclosed embodiments, a protection server stores a listing of non-ASCII Unicode characters that may be used in an IDN and, for each such non-ASCII Unicode character, the ASCII character (or possibly characters) that is visually most similar to it. The server receives records of new domain names (possibly including sub-domains), such as DNS zone files and CT logs, and evaluates these records to identify IDNs in the records, i.e., to identify domain names that contain non-ASCII Unicode characters. In order to decide whether any of these IDNs may be used for malicious purposes, the server replaces the non-ASCII Unicode characters in the IDNs with the corresponding ASCII characters from the stored listing, and thus generates candidate ASCII domain names. The server compares these candidate ASCII domain names to a list of one or more protected ASCII domain names. When a candidate ASCII domain name matches one of the protected domain names, the server initiates a protective action with respect to the corresponding IDN, for example by issuing an alert or accessing an actual resource, such as a Web page, that is identified by the IDN.

Figure 1:
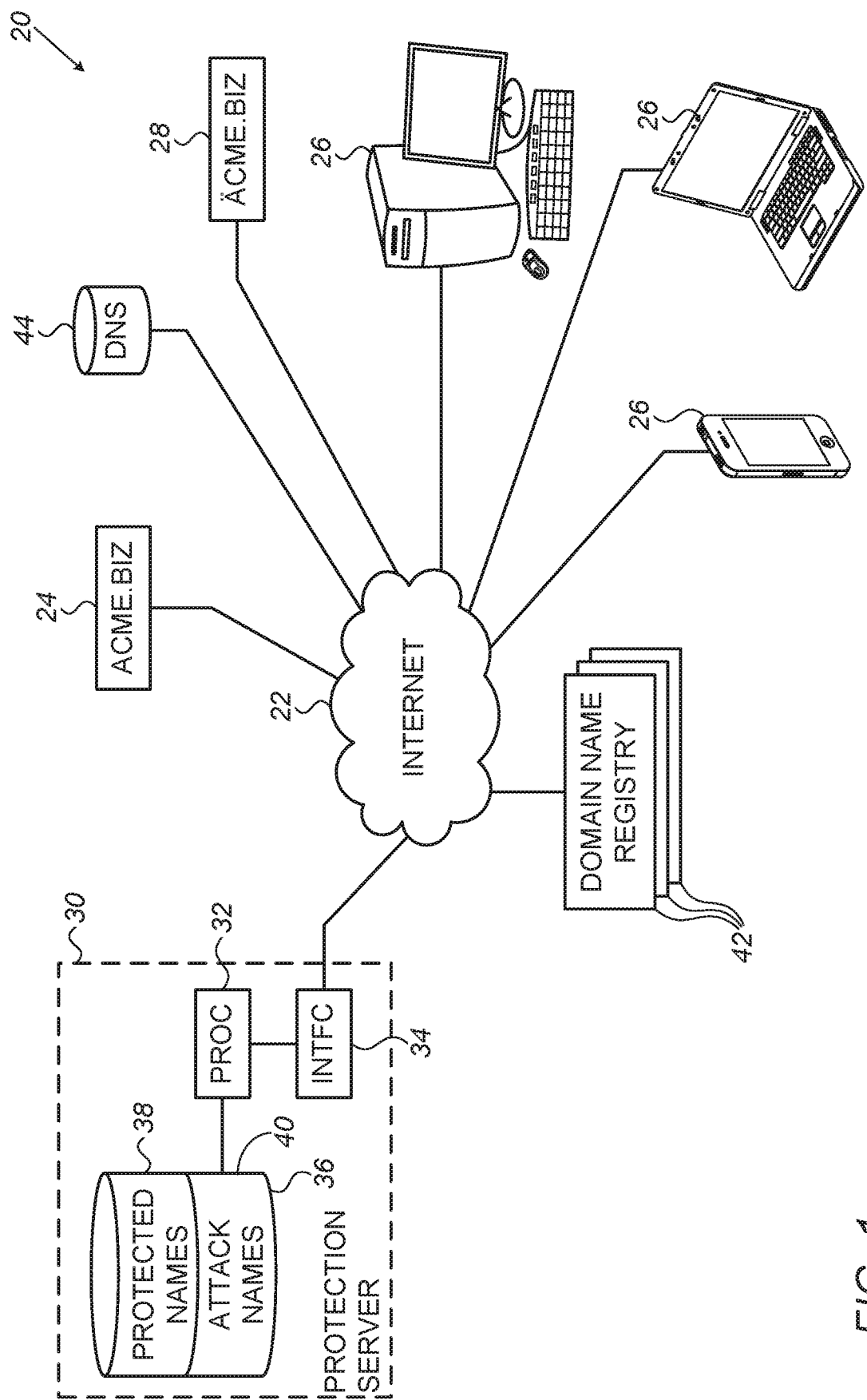
FIG. 1 is a block diagram that schematically illustrates a system for network communication including a protection server, in accordance with an embodiment of the invention.

FIG. 1 is a block diagram that schematically illustrates a system 20 for network communication including a protection server 30, in accordance with an embodiment of the invention. In the pictured scenario, client devices communicate over a public network 22, such as the Internet, with a Web site 24, identified by the (legitimate) domain name "ACME.BIZ". This domain name contains only ASCII characters. Another Web site 28 has been registered and opened with the IDN "ACME.BIZ", in which the ASCII character "A" has been replaced by the homoglyphic non-ASCII Unicode character "A". The name "ACME.BIZ" may belong to a legitimate business; but because of its visual similarity to the domain name "ACME.BIZ", there is a risk that Web site 28 will be used for malicious purposes, for example in a phishing attack against users of Web site 24.

Protection server 30 detects that the IDN "ACME.BIZ" has been registered in a domain name registry 42, and takes appropriate steps to protect against this sort of attack. Server 30 is typically a standard, general-purpose computer, comprising a programmable processor 32, which is connected to network 22 by a suitable network interface 34 and has a memory 36. The server hardware may be dedicated to the purposes described herein, or it may alternatively be a part of a computing cloud. In either case, processor 32 performs the functions that are described herein under the control of program instructions in software, which is typically stored, in memory 36 or elsewhere, on tangible, non-transitory computer-readable media, such as electronic, magnetic or optical memory media.

Server 30 stores in memory 36 a protection list 38, containing ASCII domain names (such as "ACME.BIZ") that the server is to protect against attacks using visually similar IDNs. To protect the domain names in protection list 38, server 30 accumulates and maintains an attack list 40, containing IDNs that server 30 has detected, such as the IDN "ACME.BIZ", that are visually similar to an ASCII domain name in protection list 38. Lists 38 and 40 may be in the form of databases or any other suitable data structures.

To build attack list 40, server 30 uses a listing, which can similarly be stored in memory 36, of non-ASCII Unicode characters and the corresponding ASCII characters that are visually similar to the non-ASCII Unicode characters. In other words, the listing (which may also be a database) contains the ASCII homoglyph, if any, for each of the non-ASCII Unicode characters. Thus, the record for the non-ASCII Unicode character "A" will contain the homoglyph "A". The visual similarity may be ascertained in a variety of ways, for example by means of inspection by a human operator or morphological comparison by a computer, or a combination of such methods. In some cases, the record for a given non-ASCII Unicode character may contain two or more ASCII characters (for example, the letter O and the number 0), although such cases are unusual.

Optionally, the listing of characters may also contain similarity scores, indicating the degree of similarity between each non-ASCII Unicode character and the corresponding ASCII character or characters. These scores may likewise be assigned by a human operator and/or by a computer. In this case, server 30 may apply the similarity scores in deciding whether a given IDN matches a protected ASCII domain name: If the similarity score or a combination of the scores associated with the non-ASCII Unicode characters in the IDN that are replaced by corresponding ASCII characters is below some threshold, server 30 may decide that the IDN need not be included in attack list 40.

Following this procedure, server 30 may build up an attack list 40 containing multiple IDNs that are visually similar to each of the protected domain names in protection list 38. Table I below shows an example of such a list for the protected domain name "segasec.com". Attack list 40 in Table I also contains the Punycode equivalent of each IDN:

TABLE I

EXAMPLE ATTACK LIST

| Attack IDN Domain Name | Punycode | Victim DNS Domain |
|---|---|---|
| segasec.com | xn--segase-gz5b.com | segasec.com |
| segasec.com | xn--sease-smc0588b.com | segasec.com |
| segasec.com | xn--seaec-smc95460a.com | segasec.com |
| sEgas0c.com | xn--gas-mwb9015ana3078v.com | segasec.com |
| sEgasEC.com | xn--ga-14rjc0333sda.com | segasec.com |
| SEgαs0c.com | xn--sg-6eb8lu37koa6078v.com | segasec.com |

Server 30 may initiate various sorts of protective actions with respect to the IDNs in attack list 40. For example, upon detecting a suspicious IDN, which resembles a protected domain name, in a record received from domain name registry 42, server 30 may issue an alert to the owner of Web site 24, and/or to a Web security service that is charged with protecting this Web site. Additionally or alternatively, server 30 may report the suspicious IDN to domain name registry 42 and/or to another official body.

Additionally or alternatively, server 30 may access, via network 22, a resource identified by the suspicious IDN, and may then analyze the resource in order to detect malicious content. For example, server 30 may submit a DNS request to a DNS server 44 with respect to a uniform resource locator (URL) containing the suspicious IDN in order to obtain the Internet Protocol (IP) address of Web site 28. Server 30 may then access and read the Web pages on site 28 and may analyze the content of these Web pages in order to detect a phishing attack that makes use of these Web pages. The operator of server 30 will then take the necessary steps to disable Web site 28, for example notifying the relevant regulatory and law enforcement authorities that the Web pages are being used for fraudulent activity. This process of accessing and evaluating the IDNs in attack list 40 may be repeated periodically in order to detect new attacks as they occur.

Figure 2:
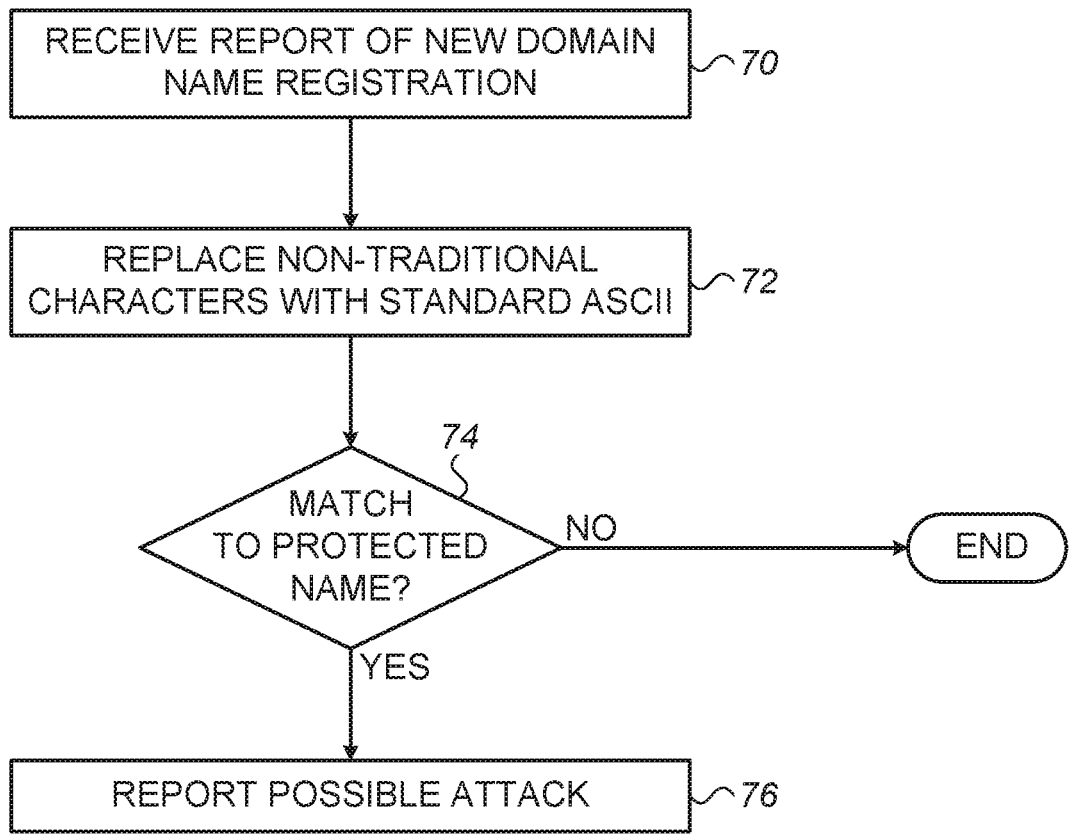
FIG. 2 is a flow chart that schematically illustrates a method for identifying domain names that may be used in an attack on a target domain, in accordance with an embodiment of the invention.

FIG. 2 is a flow chart that schematically illustrates a method for identifying IDNs that may be used in an attack on a protected domain name, in accordance with another embodiment of the invention. The method will be described here, for the sake of convenience and clarity, with reference to the elements of system 20; but the principles of this method may similarly be implemented, mutatis mutandis, in other system configurations, as will be apparent to those skilled in the art after reading the present description. All such alternative implementations are considered to be within the scope of the present invention.

The method of FIG. 2 is initiated whenever server 30 receives a report of new domain name registrations, at a report reception step 70. As noted earlier, this report may comprise, for example, a DNS zone file containing resource records identifying new domain name registrations. Such reports are typically issued periodically by domain name registries 42 and are available via the Internet. Alternatively or additionally, the reports received at step may comprise a Certificate Transparency (CT) log containing records of digital certificates, which can be obtained freely from root certificate authorities, for example. In any case, server 30 processes the resource records and/or logs in the report in order to identify any IDNs among the domain names, i.e., domain names containing non-ASCII Unicode characters.

To evaluate the IDNs found at step 70, server 30 substitutes the corresponding ASCII characters for the non-ASCII Unicode characters in each IDN, using the listing of correspondence that is stored in memory 36, at a character replacement step 72. The server thus generates candidate ASCII domain names corresponding to the IDNs. For example, the IDN "ACME.BIZ" will give the candidate ASCII domain name "ACME.BIZ". Server 30 compares each candidate ASCII domain name to the protected domain names in protected list 38, at a candidate comparison step 74. If no match is found, the corresponding IDN is considered harmless and is ignored.

On the other hand, when a candidate ASCII domain name matches one of the protected ASCII domain names at step 74, as in the case of "ACME.BIZ" and "ACME.BIZ", server 30 initiates a protective action with regard to the IDN, at a protection step 76. Typically, server 30 will add the IDN to attack list 40 and will issue a report, possibly together with more active protective measures, as described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for evaluating domain names, comprising:
storing a listing, for a plurality of non-ASCII Unicode characters, of corresponding ASCII characters that are visually similar to the non-ASCII Unicode characters;

receiving a record of one or more Internationalized Domain Names (IDNs), each IDN containing at least one of the non-ASCII Unicode characters;

substituting the corresponding ASCII characters for the non-ASCII Unicode characters in the record in order to generate candidate ASCII domain names corresponding to the one or more IDNs;

comparing the candidate ASCII domain names to one or more protected ASCII domain names; and when a candidate ASCII domain name matches one of the protected ASCII domain names, initiating a protective action with regard to the IDN corresponding to the candidate ASCII domain name.

2. The method according to claim 1, wherein storing the listing comprises storing respective similarity scores indicating a degree of similarity between the non-ASCII Unicode characters and the corresponding ASCII characters, and wherein comparing the candidate ASCII domain names comprises applying the similarity scores in deciding whether the candidate ASCII domain names match the protected ASCII domain names.

3. The method according to claim 1, wherein receiving the record comprises obtaining a Domain Name System (DNS) zone file containing resource records, and processing the resource records in order to identify the one or more IDNs.

4. The method according to claim 3, wherein obtaining the DNS zone file comprises receiving the DNS zone file from a registrar of domain names.

5. The method according to claim 1, wherein receiving the record comprises obtaining a Certificate Transparency (CT) log containing records of digital certificates, and processing the log in order to identify the one or more IDNs.

6. The method according to claim 1, wherein initiating the protective action comprises accessing, via a network, a resource identified by the IDN corresponding to the candidate ASCII domain name, and analyzing the resource in order to detect malicious content.

7. The method according to claim 6, wherein accessing the resource comprises reading a Web page having a uniform resource locator (URL) containing the IDN, and detecting a phishing attack associated with the Web page.

8. Apparatus for evaluating domain names, comprising:

a memory configured to store a listing, for a plurality of non-ASCII Unicode characters, of corresponding ASCII characters that are visually similar to the non-ASCII Unicode characters; and a processor, which is configured to:
  receive a record of one or more Internationalized Domain Names (IDNs), each IDN containing at least one of the non-ASCII Unicode characters,
  substitute the corresponding ASCII characters for the non-ASCII Unicode characters in the record in order to generate candidate ASCII domain names corresponding to the one or more IDNs,
  compare the candidate ASCII domain names to one or more protected ASCII domain names, and
  when a candidate ASCII domain name matches one of the protected ASCII domain names, initiate a protective action with regard to the IDN corresponding to the candidate ASCII domain name.

9. The apparatus according to claim 8, wherein the listing of the corresponding ASCII characters comprises respective similarity scores indicating a degree of similarity between the non-ASCII Unicode characters and the corresponding ASCII characters, and wherein the processor is configured to apply the similarity scores in deciding whether the candidate ASCII domain names match the protected ASCII domain names.

10. The apparatus according to claim 8, wherein the record comprises a resource record in a Domain Name System (DNS) zone file.

11. The apparatus according to claim 10, wherein the processor is configured to obtain the DNS zone file from a registrar of domain names.

12. The apparatus according to claim 8, wherein the processor is configured to read the record from a Certificate Transparency (CT) log containing records of digital certificates.

13. The apparatus according to claim 8, wherein the protective action comprises accessing, via a network, a resource identified by the IDN corresponding to the candidate ASCII domain name, and analyzing the resource in order to detect malicious content.

14. The apparatus according to claim 13, wherein accessing the resource comprises reading a Web page having a uniform resource locator (URL) containing the IDN, and detecting a phishing attack associated with the Web page.

15. A computer software product, comprising a non-transitory computer-readable medium in which program instructions are stored, which instructions, when read by a computer, cause the computer to:

store a listing, for a plurality of non-ASCII Unicode characters, of corresponding ASCII characters that are visually similar to the non-ASCII Unicode characters;

receive a record of one or more Internationalized Domain Names (IDNs), each IDN containing at least one of the non-ASCII Unicode characters;

substitute the corresponding ASCII characters for the non-ASCII Unicode characters in the record in order to generate candidate ASCII domain names corresponding to the one or more IDNs;

compare the candidate ASCII domain names to one or more protected ASCII domain names; and when a candidate ASCII domain name matches one of the protected ASCII domain names, initiate a protective action with regard to the IDN corresponding to the candidate ASCII domain name.

16. The product according to claim 15, wherein the listing of the corresponding ASCII characters comprises respective similarity scores indicating a degree of similarity between the non-ASCII Unicode characters and the corresponding ASCII characters, and wherein the instructions cause the computer to apply the similarity scores in deciding whether the candidate ASCII domain names match the protected ASCII domain names.

17. The product according to claim 15, wherein the record comprises a resource record in a Domain Name System (DNS) zone file.

18. The product according to claim 17, wherein the instructions cause the computer to obtain the DNS zone file from a registrar of domain names.

19. The product according to claim 15, wherein the instructions cause the computer to read the record from a Certificate Transparency (CT) log containing records of digital certificates.

20. The product according to claim 15, wherein the protective action comprises accessing, via a network, a resource identified by the IDN corresponding to the candidate ASCII domain name, and analyzing the resource in order to detect malicious content.

21. The product according to claim 20, wherein accessing the resource comprises reading a Web page having a uniform resource locator (URL) containing the IDN, and detecting a phishing attack associated with the Web page.

* * * * *